US012781952B2

(12) United States Patent
Silberling

(10) Patent No.: US 12,781,952 B2
(45) Date of Patent: Nov. 3, 2026

(54) WIRELESSLY CONTROLLED LIGHTS FOR SURROGATE TARGETS

(71) Applicant: Dynamic Research, Inc., Torrance, CA (US)

(72) Inventor: Jordan Y Silberling, Redondo Beach, CA (US)

(73) Assignee: Dynamic Research, Inc., Torrance, CA (US)

( * ) Notice: Subject to any disclaimer, the term of this patent is extended or adjusted under 35 U.S.C. 154(b) by 394 days.

(21) Appl. No.: 18/695,185

(22) PCT Filed: Oct. 11, 2022

(86) PCT No.: PCT/US2022/046246
§ 371 (c)(1),
(2) Date: Mar. 25, 2024

(87) PCT Pub. No.: WO2023/064252
PCT Pub. Date: Apr. 20, 2023

(65) Prior Publication Data
US 2024/0392961 A1 Nov. 28, 2024

Related U.S. Application Data

(60) Provisional application No. 63/254,986, filed on Oct. 12, 2021.

(51) Int. Cl.
*F21V 23/06* (2006.01)
*F21V 23/04* (2006.01)
*G01M 17/007* (2006.01)

(52) U.S. Cl.
CPC .......... *F21V 23/06* (2013.01); *F21V 23/0435* (2013.01); *G01M 17/007* (2013.01)

(58) Field of Classification Search
CPC ..... B32B 3/06; F21V 23/0435; F21V 23/0442
See application file for complete search history.

(56) References Cited

U.S. PATENT DOCUMENTS

2013/0017346 A1* 1/2013 Kelly ........................ B60T 7/18 428/33
2019/0366872 A1* 12/2019 Kanamori ............... B60L 58/12

FOREIGN PATENT DOCUMENTS

EP 3481684 B1 * 12/2023 ............ B60T 17/221

OTHER PUBLICATIONS

Innovation Q+ NPL and Patent Search (Year: 2026).*

* cited by examiner

*Primary Examiner* — Anabel Ton
(74) *Attorney, Agent, or Firm* — Manuel de la Cerra

(57) ABSTRACT

A lighting system for a soft surrogate target constructed to be mounted to a mobile platform having a power source is disclosed. The lighting system includes a wireless receiver/controller, a plurality of relays connected to the wireless receiver/controller, a plurality of lights connected to the plurality of relays, and a breakaway electrical connector electrically connected to the wireless receiver/controller. The breakaway connector is constructed to detachably connect the mobile platform's power source to the lighting system. The breakaway electrical connector is further adapted to disconnect the lighting system from the mobile platform's power source without damage to the connector when the surrogate target is suddenly dislodged from the mobile platform due to the surrogate target being impacted by a subject vehicle.

20 Claims, 8 Drawing Sheets

WIRELESSLY CONTROLLED LIGHTS FOR SURROGATE TARGETS

1.0 RELATED APPLICATIONS

The present invention is the Section 371 national filing of PCT application PCT/US22/46246 entitled "Wirelessly Controlled Lights for Surrogate Targets" filed on Oct. 11, 2022, which in turn claims priority to U.S. Provisional Patent Application No. 63/254,986 entitled "Wirelessly Controlled Lights for Surrogate Targets", filed Oct. 12, 2021, each of which is hereby incorporated herein in its entirety including all tables, figures, and claims.

2.0 TECHNICAL FIELD

The present invention relates to devices, systems, and methods for testing crash avoidance technologies.

3.0 BACKGROUND

The system disclosed herein can be used with, but is not limited to, vehicles employed in crash avoidance technologies disclosed in the following patent applications developed by the same inventors and assigned to the same assignee: U.S. patent application Ser. No. 14/050,039 entitled "System and Method for testing Crash Avoidance Technologies" filed on Oct. 9, 2013 by Joseph Kelly et al; U.S. patent application Ser. No. 14/050,048 entitled "System and Method for testing Crash Avoidance Technologies" filed on Oct. 9, 2013 by Joseph Kelly et al; U.S. Patent Application No. 61/874,274 entitled "Master-Slave Automated Coordinated Vehicle Control" filed Sep. 5, 2013 by Joseph Kelly et al; U.S. Patent Application No. 61/874,267 entitled "Rigid Belt Drive Tensioner" filed Sep. 5, 2013 by Joseph Kelly et al; U.S. Patent Application No. 61/874,264 entitled "Robotic Hydraulic Brake Master Cylinder" filed Sep. 5, 2013 by Joseph Kelly et al; U.S. patent application Ser. No. 13/357,526 entitled "System and Method for Testing Crash Avoidance Technologies" filed Jan. 24, 2012 by Joseph Kelly et al (issued as U.S. Pat. No. 8,447,509); U.S. Patent Application No. 61/507,539 entitled "Guided Soft Target For Full Scale Advanced Crash Avoidance Technology Testing" filed on Jul. 13, 2011 by Joseph Kelly et al; U.S. Patent Application No. 61/578,452 entitled "Guided Soft Target For Full Scale Advanced Crash Avoidance Technology Testing" filed on Dec. 21, 2011 by Joseph Kelly et al; U.S. Patent Application No. 61/621,597 entitled "Collision Partner, System and Method" filed on Apr. 9, 2012 by Joseph Kelly et al; U.S. Patent Application No. 61/639,745 entitled "Devices, Systems, And Methods For Testing Crash Avoidance Technologies" filed on Apr. 27, 2012 by Joseph Kelly et al; U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428, 864); U.S. patent application Ser. No. 13/532,396 entitled "Devices, Systems, And Methods For Testing Crash Avoidance Technologies" filed on Jun. 25, 2012 by Joseph Kelly et al (issued as U.S. Pat. No. 8,457,877); U.S. patent application Ser. No. 13/532,417 entitled "Devices, Systems, And Methods For Testing Crash Avoidance Technologies" filed on Jun. 25, 2012 by Joseph Kelly et al; and U.S. patent application Ser. No. 13/532,430 entitled "Devices, Systems, And Methods For Testing Crash Avoidance Technologies" filed on Jun. 25, 2012 by Joseph Kelly et al. Each of these patent applications is incorporated herein in its entirety including all tables, figures, and claims.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP), also known as a surrogate target, reliably and precisely along a trajectory that would ultimately result in a crash in a variety of configurations, such as rear-ends, head-ons, crossing paths, and sideswipes. Additionally, the Soft CP should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or the subject vehicle. When a collision occurs with the GST system, the subject vehicle impacts the Soft CP, which then absorbs the collision and may collapse and/or separate from the DME. Such a Soft CP is disclosed in U.S. patent application Ser. No. 13/532,366 (issued as U.S. Pat. No. 8,428,863), incorporated by reference. This is disclosed fully in the previous patent applications listed above and incorporated by reference.

As vehicle-based sensors and detection algorithms become more sophisticated, it is important to also have the same lighting features as a real vehicle. The use of active lighting on Soft CP increases the realism, providing for more robust testing of the car's ACAT system.

The use of lighting on Soft CP, however, can be problematic because it requires many electrical connections between the platform which is moving the target and the target itself. For example, if a target has five lighting conditions (headlights, brake lights, tail lights, left turn, and right turn) it will need at least six electrical connections; one to power each light condition and a ground. For Soft CPs, having more connections between the platform and the target results in a higher likelihood of damage during impacts and increases the system complexity substantially.

Therefore, a lighting system for a Soft CP that overcomes these shortcomings would be advantageous. The system should realistically emulate the lighting on a vehicle, while being capable of being struck repeatedly by a vehicle without appreciable damage to either the striking vehicle or the lighting system, including the lighting system connections.

4.0 SUMMARY

The present invention provides an elegant solution to the needs described above and offers numerous additional benefits and advantages, as will be apparent to persons of skill in the art.

A lighting system for a soft surrogate target constructed to be mounted to a mobile platform having a power source is disclosed. The lighting system includes a wireless receiver/controller, a plurality of relays connected to the wireless receiver/controller, a plurality of lights connected to the plurality of relays, and a breakaway electrical connector electrically connected to the wireless receiver/controller. The breakaway connector is constructed to detachably connect the mobile platform's power source to the lighting system. The breakaway electrical connector is further adapted to disconnect the lighting system from the mobile platform's power source without damage to the connector when the surrogate target is suddenly dislodged from the mobile platform due to the surrogate target being impacted by a subject vehicle.

The breakaway connector may be coaxial, and also magnetic. The breakaway connector may also be a standard BNC-type or TNC-type connector absent the locking structures normally present on such connectors.

The plurality of lights may include a left signal light, a right signal light, running lights/headlights, tail lights, and brake lights. An electrical device may also be connected to one of the plurality of relays.

The lighting system may be self-contained with a battery, thus obviating the need for a breakaway connector.

The lighting system may be part of a larger vehicle testing system that includes a surrogate target, a mobile platform and a remote controller. The mobile platform or the remote controller may send wireless control signals to the wireless-receiver/controller, and the wireless receiver/controller actuates the plurality of relays according to the wireless control signals.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

6.0 DETAILED DESCRIPTION

Figure 1A:
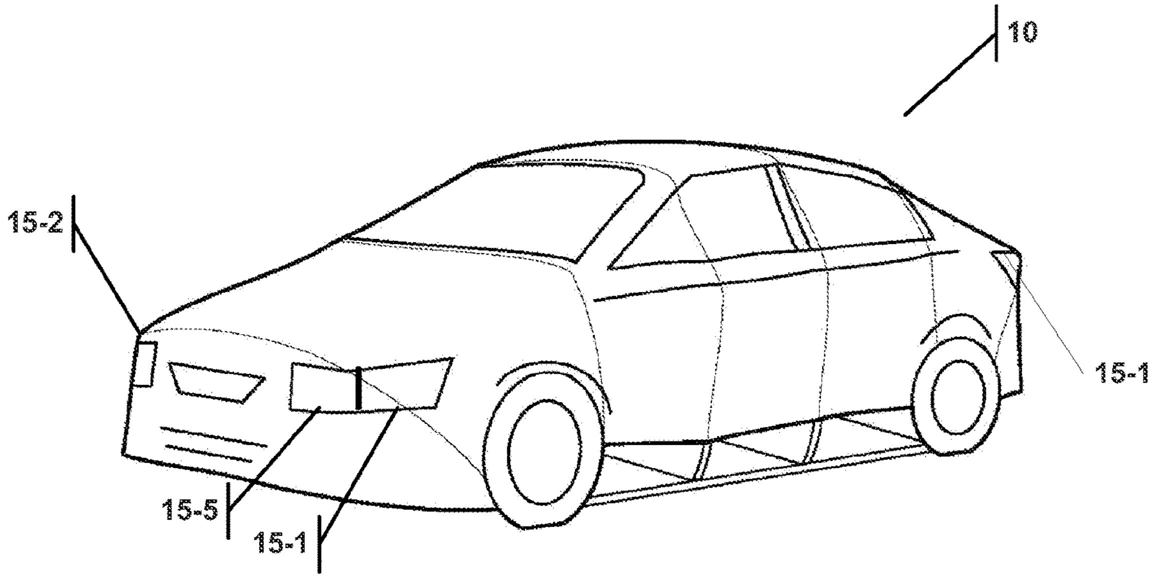
FIG. 1A is a front isometric view of a surrogate target.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Surrogate Target 10
Left Signal Light 15-1
Right Signal Light 15-2
Brake Lights 15-3
Tail Lights 15-4

Headlight/Running Lights 15-5
Expansion Electric Device 15-6
Lighting System 20
Lighting System Expansion 20*a*
Lighting System Self-Contained 20*b*
Wireless Receiver/Controller 25
Control Lines 30
Expansion Control Lines 30*a*
Power Positive 32
Power Negative (Ground) 34
Left Signal Light Relay 35-1
Right Signal Light Relay 35-2
Brake Lights Relay 35-3
Tail Lights Relay 35-4
Headlight/Running Lights Relay 35-5
Expansion Electric Device Relay 35-6
Plurality of Expansion Electric Device Relays 35-7
High/Low Intensity Module 40
Power Lines Exiting Surrogate Target 42
Break Away Connector 45*a*, 45*b*
Cable Side Breakaway Component 45*ab*, 45*bb*
Mobile Platform Side Breakaway Component 45*aa*, 45*ba*
Magnet 47
Mobile Platform (DME) 55
Subject Vehicle 60
Remote Controller 65
Surrogate Target Battery 70

In order to overcome the limitations of the prior art detailed above, a system whereby only two connections (power and ground) are required to be provided to the surrogate target. The control signals are provided via wireless communication from either a base station or from the mobile platform to a wireless receiver/controller in the surrogate target. The wireless control signals switch the lights off and on using an array of small relays that are connected to the wireless receiver/controller and integrated into the surrogate target. To increase the robustness of the system, additional lights can be added and connected to the wireless receiver/controller without adding any additional physical connections between the surrogate target and the platform. Additionally, the lighting control can be synchronized with the motion of the platform such that a turn signal is activated before a turn and the brake light can be activated during braking.

Figure 1B:
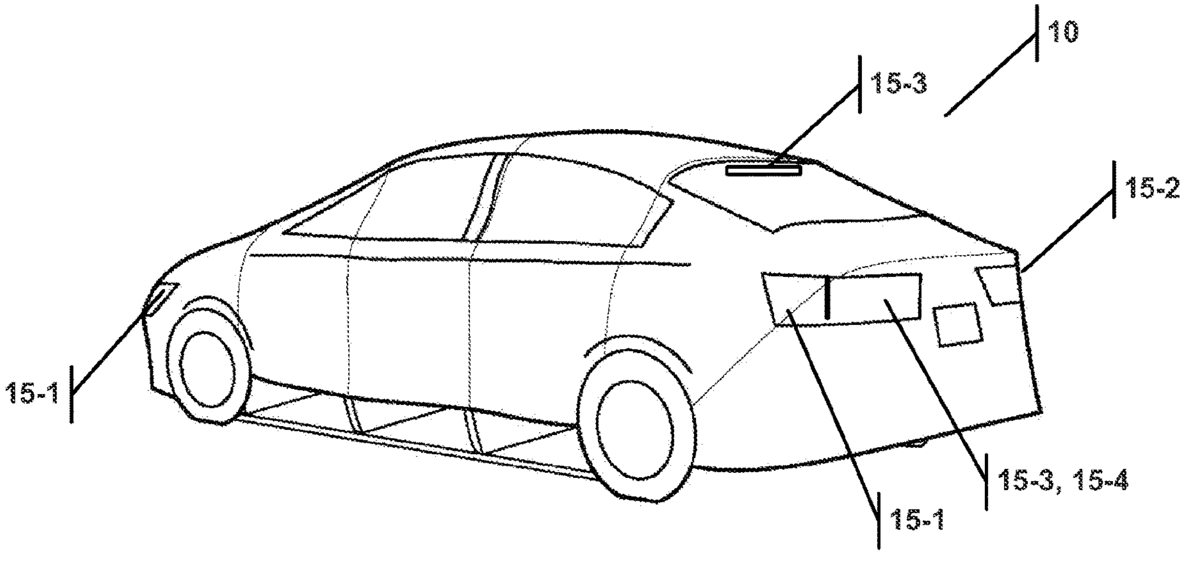
FIG. 1B is a rear isometric view of a surrogate target.

Referencing FIGS. 1A and 1B, a surrogate target 10 is shown with various lights. The rear of the target 10 may have a left signal light 15-1, a right signal light 15-2, brake lights 15-3 and tail lights 15-4. As drawn, the brake light 15-3 and tail light 15-4 may be in the same light fixture. The front of the target may have left signal light 15-1, a right signal light 15-2, headlights/running lights 15-5.

Figure 2:
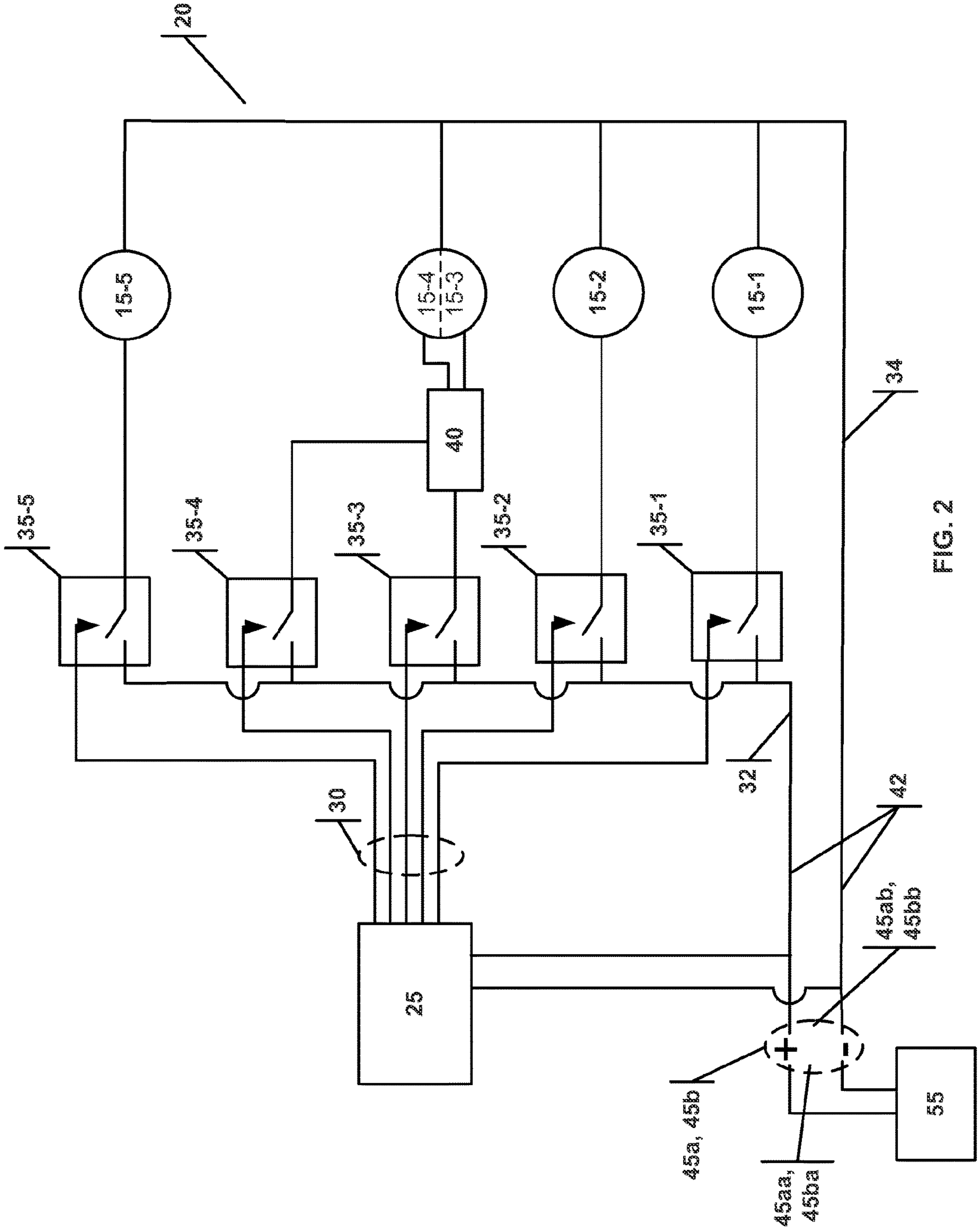
FIG. 2 is a schematic of the lighting system.

The lighting system 20 is shown schematically in FIG. 2. The system 20 includes a wireless receiver/controller 25 connected via control lines 30 to an array of relays-left signal light relay 35-1, right signal light relay 35-2, brake light relay 35-3, tail light relay 35-4 and headlight/running lights relay 35-5. When the brake light or the tail light are actuated, then high/low intensity module 40 can power the lights to control the intensity. This may be used when, as in FIG. 2, the tail light and brake light are the same—low intensity for tail light and high intensity for brake light. Alternatively, the high/low intensity module 40 may be omitted and two sets of lights used—one for the tail lights and one for the brake lights. The power of the system 20 is provided via the breakaway connector 45*a*, 45*b* and power lines 32 and 34. The power lines exiting the surrogate target 10 are shown as cable 42 upon which the cable side breakaway component 45*ab*, 45*bb* may be attached. Mobile platform 55 connects to the cable side breakaway component 45*ab*, 45*bb* via the mobile platform side breakaway component 45*aa*, 45*ba*, providing power to the lighting system.

Figure 3A:
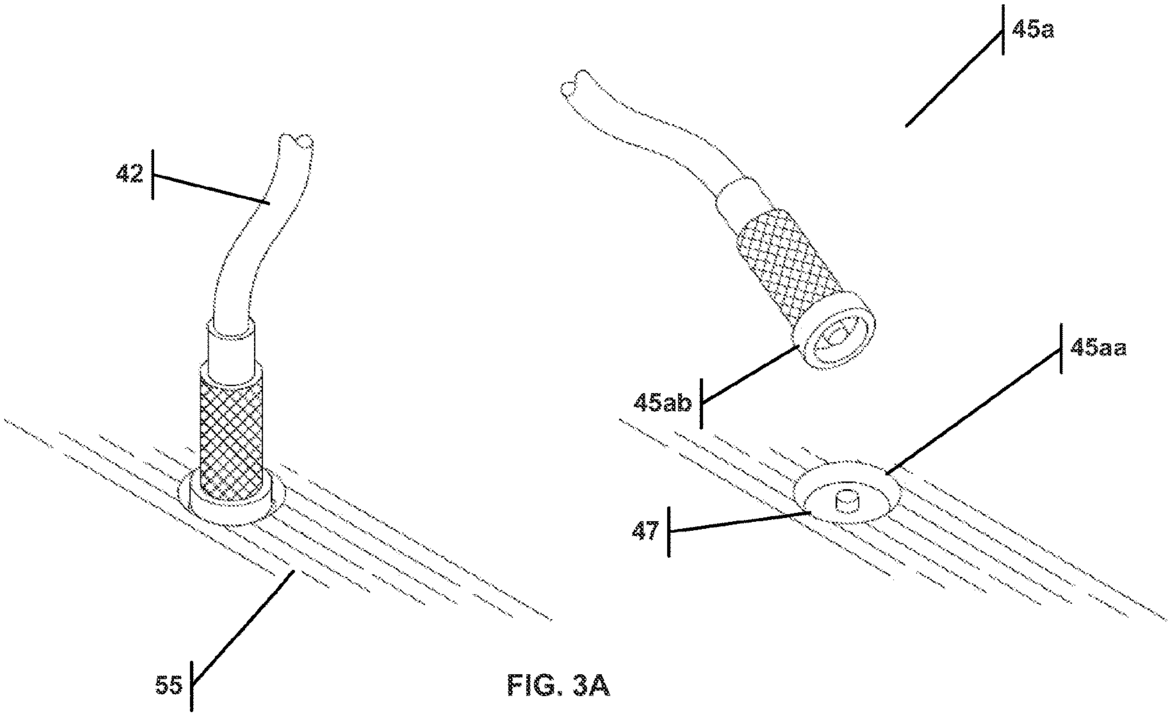
FIG. 3A illustrates a breakaway connector.
Figure 3B:
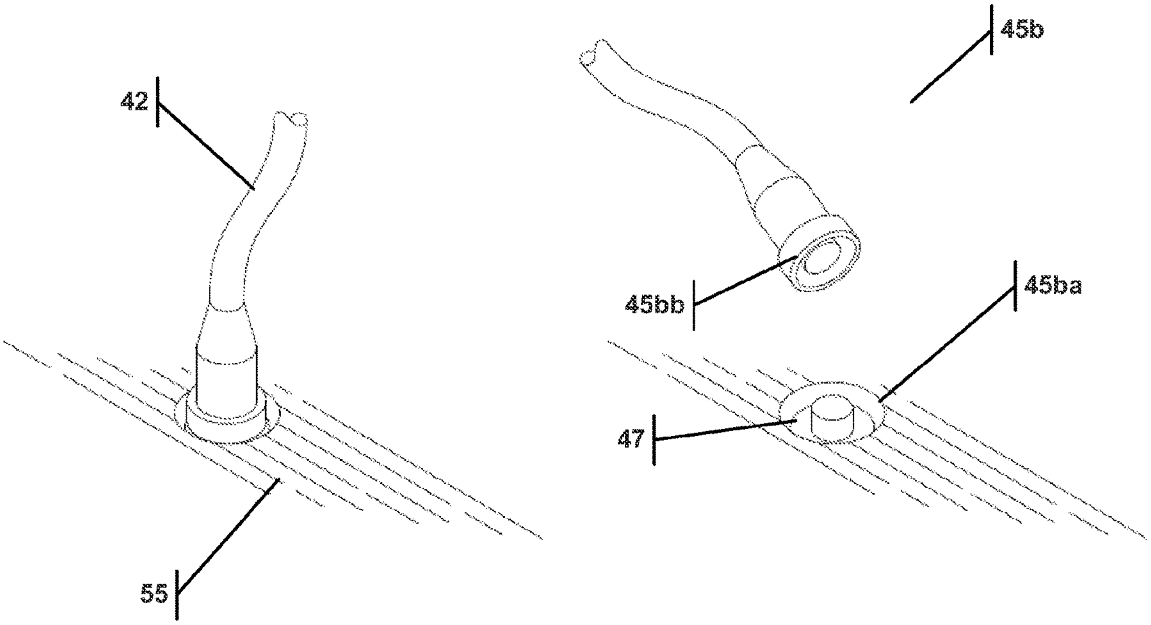
FIG. 3B illustrates a breakaway connector.

FIGS. 3A and 3B illustrate two types of breakaway connectors 45*a*, 45*b* that connect cable 42 to the mobile platform 55, the connectors comprised of the cable side breakaway component 45*ab*, 45*bb* and the mobile platform side breakaway component 45*aa*, 45*ba*. The connectors may have a magnet 47 to assist in maintaining the electrical connection, where the magnet may be selected to allow for consistent breakaway under expected collision forces. The magnetic 2-contact connector provides reliable power and ground to the target without needing to carefully align the contacts since it uses a coaxial design. The coupling could alternatively be mechanical instead of magnetic, for example a standard BNC-type or TNC-type connector absent the locking structures normally present on such connectors. The connectors discussed are not exhaustive, and other types will be apparent to a person of ordinary skill in the art.

To further prevent damage, the mobile platform side of the breakaway connector may be recessed below the top surface of the mobile platform.

Figure 4:
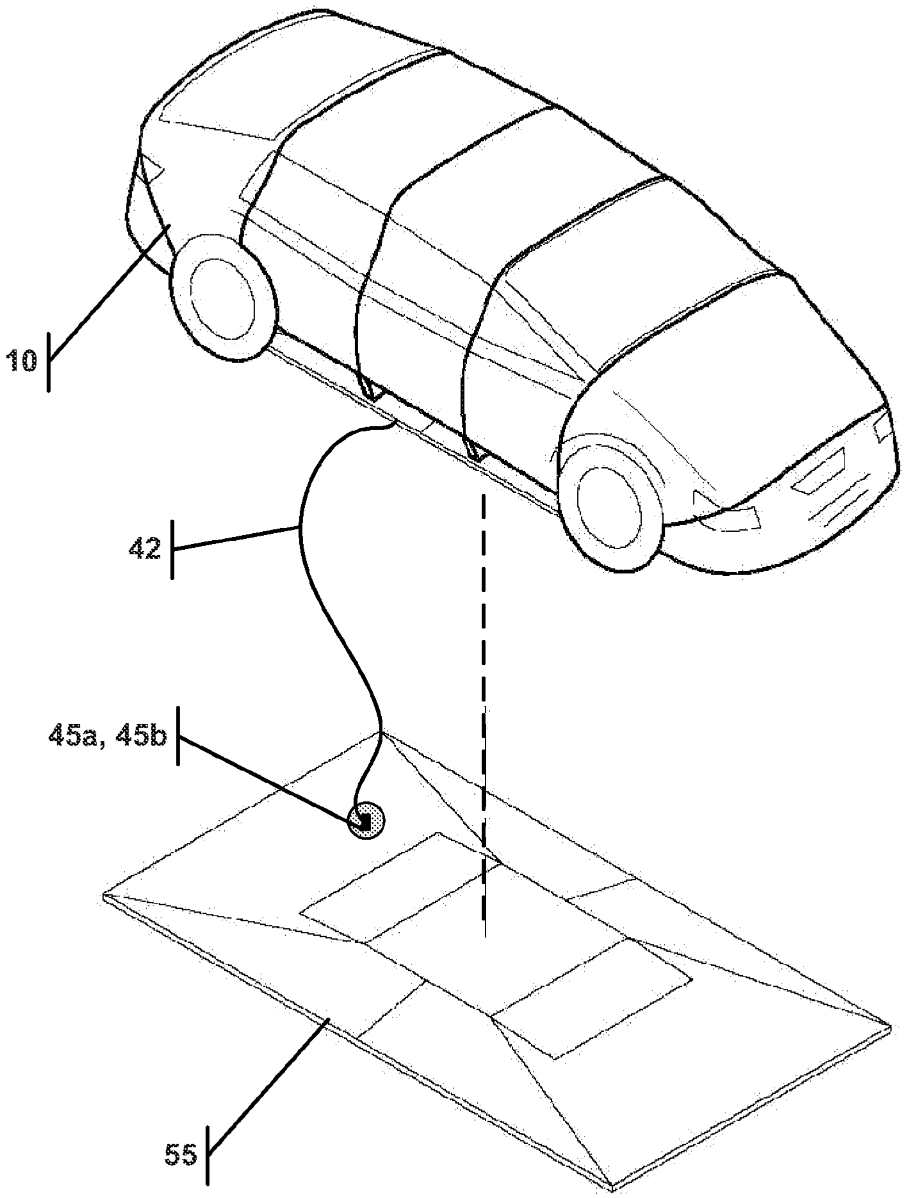
FIG. 4 illustrates the surrogate target mounting the mobile platform.
Figure 5A:
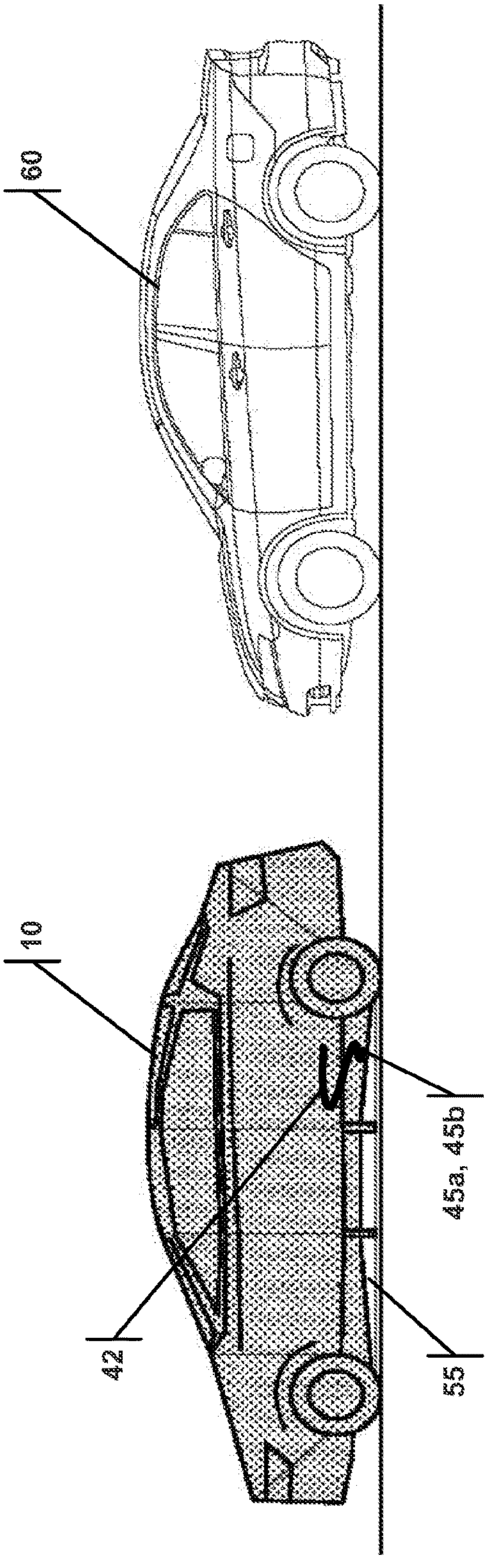
FIG. 5A illustrates the surrogate target mounted on the mobile platform, with the lighting system connected to the mobile platform through a breakaway connector, prior to impact from a subject vehicle.
Figure 5B:
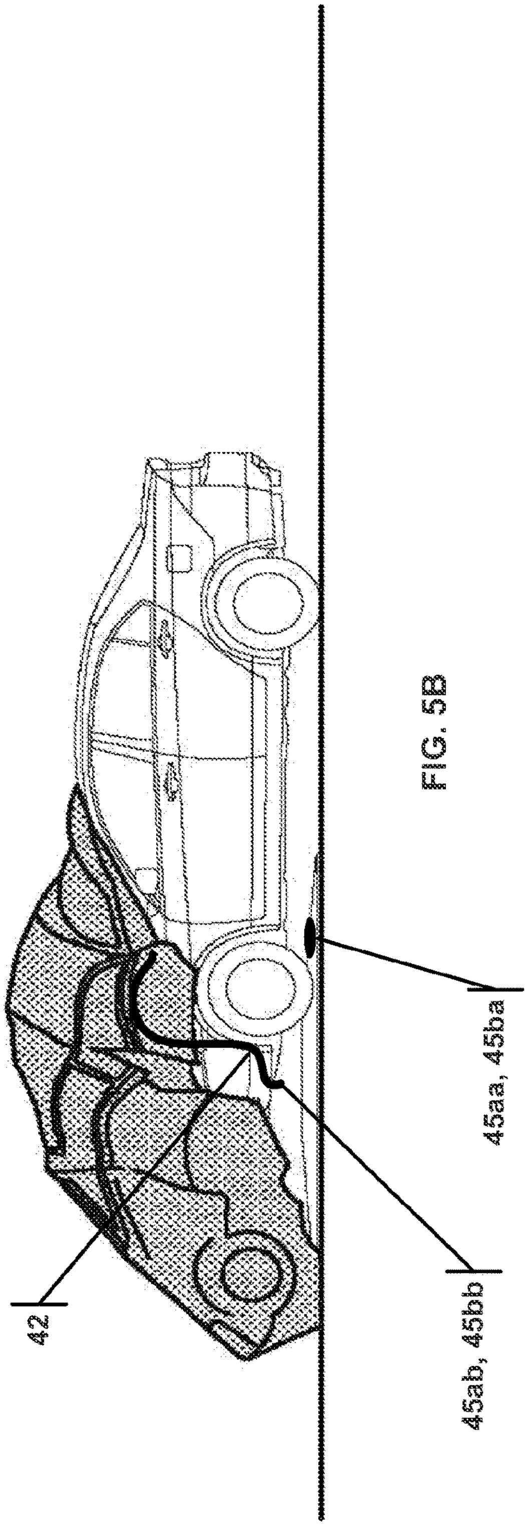
FIG. 5B illustrates the subject vehicle colliding with the surrogate target, dislodging the surrogate target from the mobile platform and disconnecting the breakaway connector.

In FIG. 4 the surrogate target 10 is mounted on the mobile platform 55, with the cable 42 electrically connected to the platform via breakaway connector 45*a*, 45*b*. FIG. 5A illustrates the surrogate target 10 completely mounted to the platform 55 and traveling in front of a subject vehicle 60. A collision is shown in FIG. 5B, where the subject vehicle 60 has dislodged the surrogate target from the platform 55, causing the breakaway connector 45*a*, 45*b* to disconnect. It should be noted that while the surrogate target is illustrated as a full automobile, it could be another shape such as a motorcycle, scooter, or a partial vehicle.

Figure 6A:
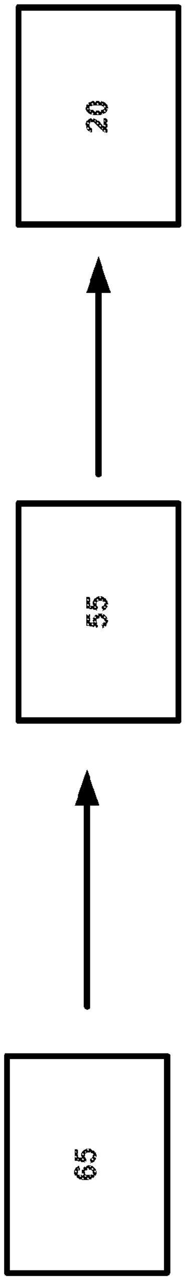
FIG. 6A illustrates control of the lighting system of a surrogate target by a remote controller, with the mobile platform as an intermediary.
Figure 6B:
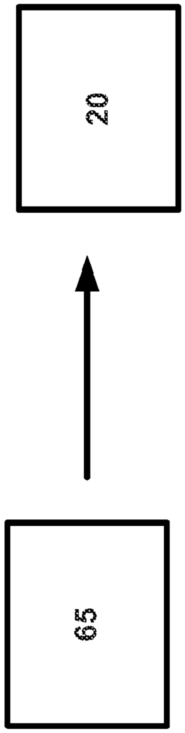
FIG. 6B illustrates direct control of the lighting system of a surrogate target by a remote controller.

A remote controller 65 may send wireless control signals to the lighting system 20 through the mobile platform 55, as shown in FIG. 6A. The signals may also be sent directly to the lighting system 20 as shown in FIG. 6B. The signals may be synchronized with the motion of the platform such that a turn signal is activated before a turn and the brake light can be activated during braking.

Figure 7:
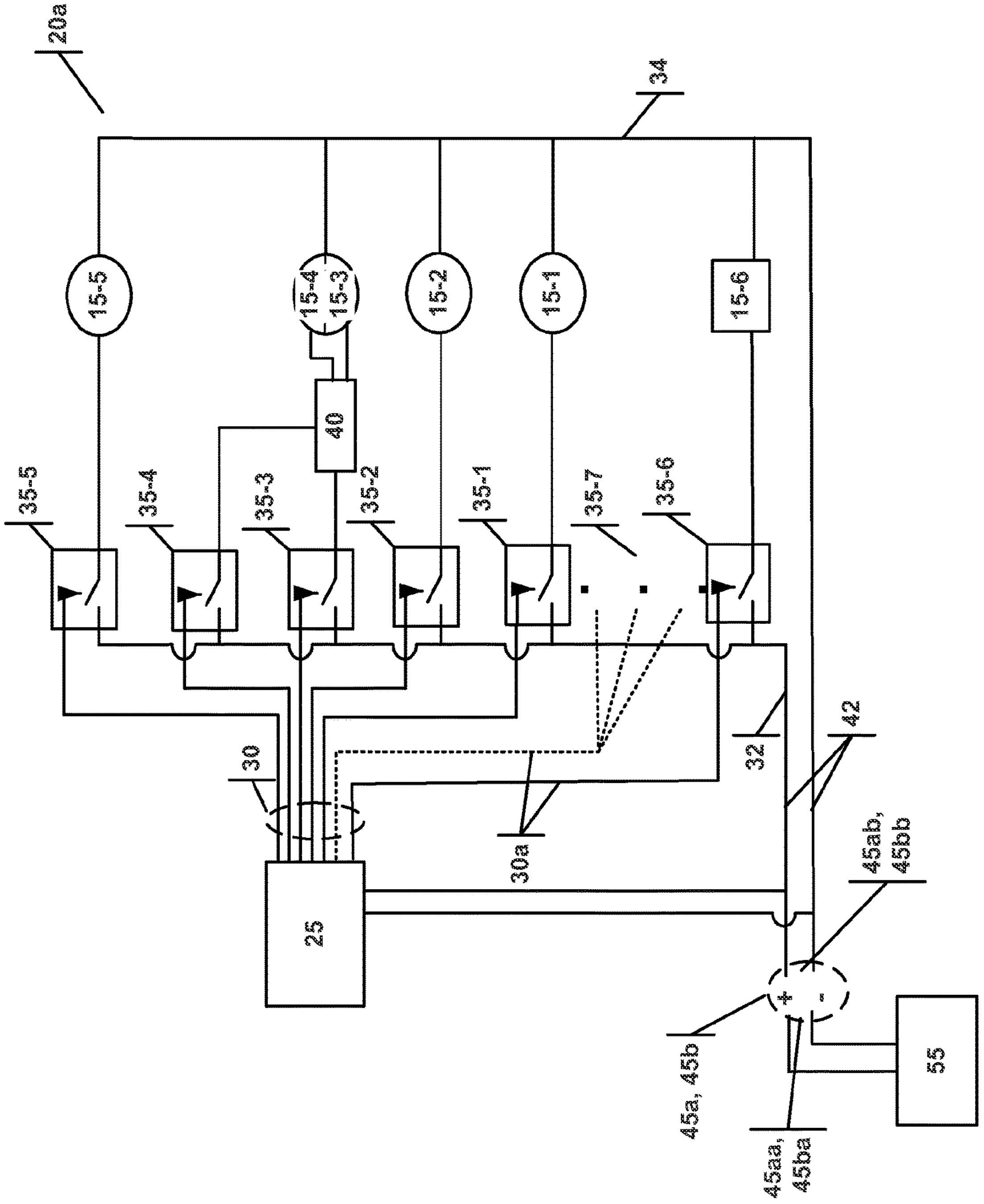
FIG. 7 is a schematic of the lighting system expanded to power and control additional electric devices.

The lighting system can be expanded to accommodate additional lights or other electric devices, as shown in FIG. 7. An expansion electric device 15-6 may be connected to an expansion electric device relay 35-6 controlled by expansion control line 30*a*. Other electric devices can be added with additional relays 35-7 with expansion control lines 30*a*. It is important to note that the expansion of the devices within the surrogate target 10 does not increase the size, complexity or robustness of the connection between the surrogate target 10 and the mobile platform 55. Non-limiting examples of the expansion electric devices include lights, speakers, and motors.

Figure 8:
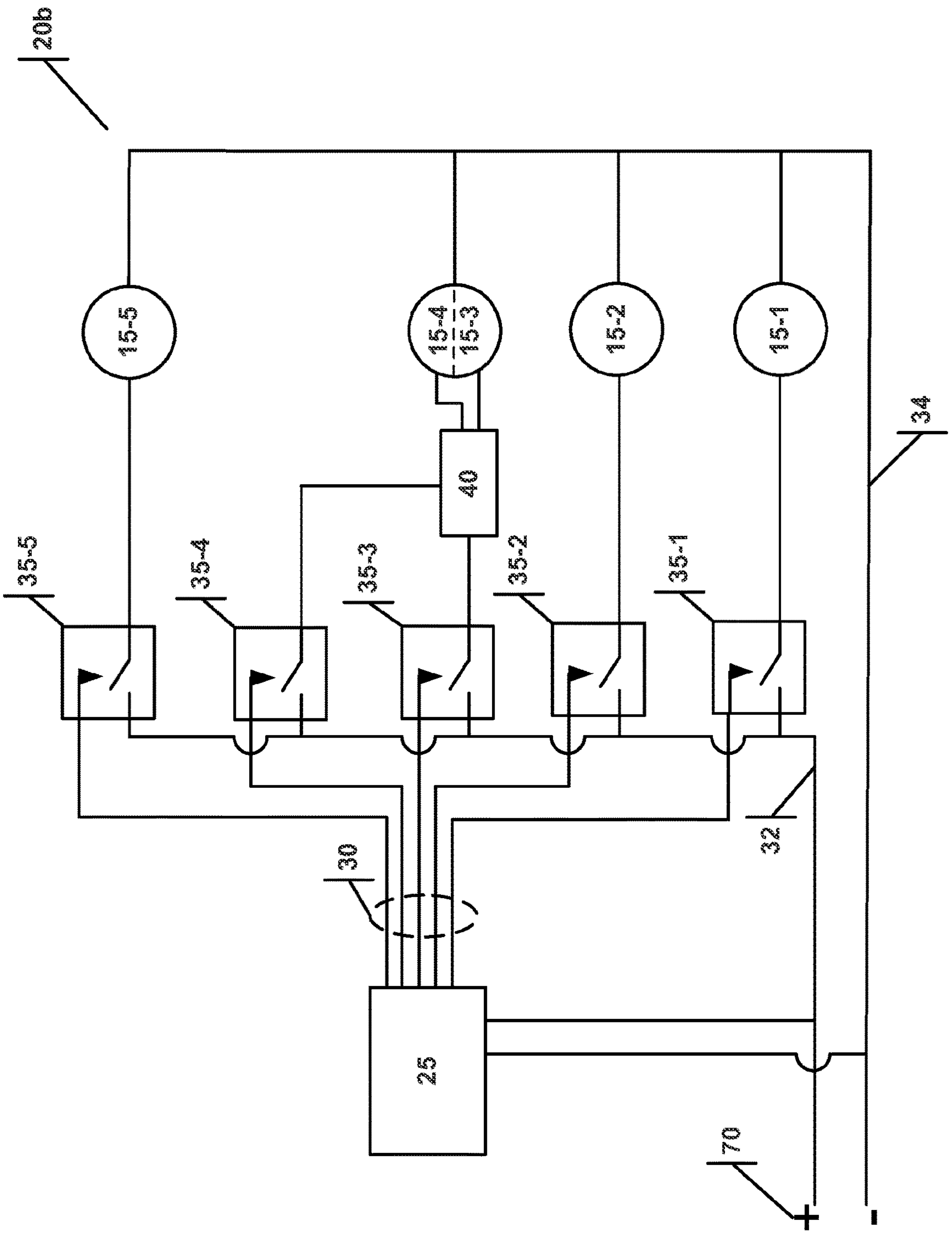
FIG. 8 is a schematic of a self-contained lighting system with a battery, thus obviating the need for a breakaway connector.

Finally, FIG. 8 is a schematic of a lighting system 20*b* that is fully housed by the surrogate target, thus obviating the need for the breakaway connector. The system 20*b* contains a surrogate target battery 70 that powers the various components of the system 20*b*. A possible drawback to this self-contained system is that the battery 70 would likely create a hard mass within the soft surrogate target 10 that may cause damage to the subject vehicle 60. Also accessing, charging and replacing the battery 70 may increase the complexity of the system.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A lighting system housed in a soft surrogate target that is constructed to be mounted to a mobile platform having a power source, the lighting system comprising:

a wireless receiver/controller;

a plurality of relays connected to the wireless receiver/controller wherein each in the plurality of relays is independently controllable by the wireless receiver/controller;

a plurality of lights connected to the plurality of relays;

a breakaway electrical connector electrically connected to the wireless receiver/controller, and constructed to detachably connect the mobile platform's power source to the lighting system;

wherein the breakaway electrical connector is adapted to disconnect the lighting system from the mobile platform's power source without damage to the connector when the surrogate target is suddenly dislodged from the mobile platform due to the surrogate target being impacted by a subject vehicle.

2. The lighting system of claim 1, wherein the breakaway connector is coaxial.

3. The lighting system of claim 1, wherein the breakaway connector comprises a magnet.

4. The lighting system of claim 1, wherein the breakaway connector comprises a standard BNC-type or TNC-type connector absent the locking structures normally present on such connectors.

5. The lighting system of claim 1, wherein the plurality of lights comprises at least two selected from: a left signal light, a right signal light, tail lights, brake lights and headlight/running light.

6. The lighting system of claim 1, wherein an electrical device is connected to one of the plurality of relays.

7. A lighting system housed in a soft surrogate target that is constructed to be mounted to a mobile platform, the lighting system comprising:

a wireless receiver/controller;

a plurality of relays connected to the wireless receiver/controller wherein each in the plurality of relays is independently controllable by the wireless receiver/controller;

a plurality of lights connected to the plurality of relays;

a battery electrically connected to the wireless receiver/controller, the plurality of relays, and the plurality of lights.

8. The lighting system of claim 7, wherein the plurality of lights comprises at least two selected from: a left signal light, a right signal light, tail lights, brake lights and headlight/running light.

9. A vehicle test system comprising:

a mobile platform comprising a power source;

a soft surrogate target constructed to be detachably mounted to the mobile platform; the target comprising:

a wireless receiver/controller;

a plurality of relays connected to the wireless receiver/controller wherein each in the plurality of relays is independently controllable by the wireless receiver/controller;

a plurality of lights connected to the plurality of relays;

a breakaway electrical connector electrically connected to the wireless receiver/controller connector, the plurality of relays, and the plurality of lights, and constructed to detachably connect the mobile platform's power source to the lighting system;

wherein the breakaway electrical connector is adapted to disconnect the lighting system from the mobile platform's power source without damage to the connector when the surrogate target is suddenly dislodged from the mobile platform due to the surrogate target being impacted by a subject vehicle;

wherein either a remote controller or the mobile platform sends wireless control signals to the wireless receiver/controller, and the wireless receiver/controller actuates the plurality of relays according to the wireless control signals.

10. The testing system of claim 9, wherein the breakaway connector is coaxial.

11. The testing system of claim 9, wherein the breakaway connector comprises a magnet.

12. The testing system of claim 9, wherein the breakaway connector comprises a standard BNC-type or TNC-type connector absent the locking structures normally present on such connectors.

13. The testing system of claim 9, wherein the plurality of lights comprises at least two selected from: a left signal light, a right signal light, tail lights, brake lights and headlight/running light.

14. The testing system of claim 9, wherein the mobile platform comprises an outer surface, and the connection of the mobile platform to the breakaway connector is recessed from the outer surface.

15. A lighting system housed in a soft surrogate target that is constructed to be mounted to a mobile platform having a power source, the lighting system comprising:

a wireless receiver/controller;

a relay connected to the wireless receiver/controller;

a light connected to the relay;

a breakaway electrical connector electrically connected to the wireless receiver/controller, and constructed to detachably connect the mobile platform's power source to the lighting system;

wherein the breakaway electrical connector is adapted to disconnect the lighting system from the mobile platform's power source without damage to the connector when the surrogate target is suddenly dislodged from the mobile platform due to the surrogate target being impacted by a subject vehicle.

16. The lighting system of claim 15, wherein the breakaway connector is coaxial.

17. The lighting system of claim 15, wherein the breakaway connector comprises a magnet.

18. The lighting system of claim 15, wherein the breakaway connector comprises a standard BNC-type or TNC-type connector absent the locking structures normally present on such connectors.

19. The lighting system of claim 15, wherein the relay is comprised of a plurality of relays, and the light is comprised of a plurality of lights.

20. The lighting system of claim 19, wherein the plurality of lights comprises at least two selected from: a left signal light, a right signal light, tail lights, brake lights and headlight/running light.

* * * * *